(12) United States Patent  
DeCusatis et al.

(10) Patent No.: US 8,495,357 B2  
(45) Date of Patent: Jul. 23, 2013

(54) DATA SECURITY POLICY ENFORCEMENT

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 11/959,575

(22) Filed: Dec. 19, 2007

(65) Prior Publication Data

US 2009/0165076 A1  Jun. 25, 2009

(51) Int. Cl.
*H04L 29/06* (2006.01)

(52) U.S. Cl.
USPC ........... 713/153; 713/150; 713/151; 713/152; 713/166; 709/238; 709/239; 709/240; 709/241; 709/242; 709/243; 709/244; 370/351; 370/352; 370/353; 370/354; 370/355; 370/356; 370/357; 370/358; 370/360; 370/359; 705/79

(58) Field of Classification Search
USPC .................. 713/150–153, 166; 709/238–244; 370/351–360; 705/79
See application file for complete search history.

(56) References Cited

U.S. PATENT DOCUMENTS

| | | | |
|---|---|---|---|
| 2002/0176430 A1* | 11/2002 | Sangha et al. | 370/412 |
| 2002/0188871 A1 | 12/2002 | Noehring et al. | |
| 2003/0172264 A1* | 9/2003 | Dillon | 713/160 |
| 2004/0088567 A1 | 5/2004 | Lamotte | |
| 2004/0107342 A1 | 6/2004 | Pham et al. | |
| 2004/0223457 A1* | 11/2004 | Oran | 370/230 |
| 2005/0125691 A1 | 6/2005 | Garg et al. | |
| 2005/0273850 A1 | 12/2005 | Freund | |
| 2006/0021001 A1 | 1/2006 | Giles et al. | |
| 2006/0129792 A1 | 6/2006 | Bots et al. | |
| 2007/0039044 A1 | 2/2007 | Moonen | |
| 2008/0134283 A1* | 6/2008 | Park et al. | 726/1 |
| 2009/0113517 A1* | 4/2009 | Engdahl et al. | 726/1 |

* cited by examiner

*Primary Examiner* — Edan Orgad
*Assistant Examiner* — Roderick Tolentino
(74) *Attorney, Agent, or Firm* — Cantor Colburn LLP; Steven Chlu

(57) ABSTRACT

A method for data security policy enforcement including inspecting incoming and outgoing data packets from a server computing device for attributes in accordance with a data security policy, processing the data packets in accordance with the security policy based on the inspected attributes, and routing the data packets in accordance with the security policy based on the inspected attributes, wherein incoming and outgoing data from the server computing device composed of the data packets is processed and routed in accordance with the security policy on a per-packet basis. A system and computer program product is also provided.

16 Claims, 5 Drawing Sheets

US 8,495,357 B2

DATA SECURITY POLICY ENFORCEMENT

BACKGROUND OF THE INVENTION

1. Field of the Invention

This invention relates generally to data security management, and particularly to a method, system, and computer program product for data security policy enforcement.

2. Description of Background

Data security management, for example, of data that is stored on a computer server or storage device, is important in many applications. For example, corporate or government entities may store data on computer servers that needs various levels of security to limit access to the data by potential users. A popular approach to managing such data security is the use of a virtual "firewall," which is usually accomplished with a computer program that prohibits unauthorized access to all or some portion of a server, network, etc. where secure data is stored.

An improved approach to data security management has emerged in which a policy-based, data-centric security structure is used by attaching a security guideline or "policy" to data when it is created. The security policy can be modified in response to changing security needs for the data and stays with the data until it is securely destroyed or placed in long-term secure storage (e.g., an encrypted archive). Enforcement of a security policy based on this data-centric approach is usually accomplished through one or more point solutions (e.g., each addressing a specific policy requirement) that are compatible with a particular type of server or other device (e.g., a particular hardware and/or software "platform"), and the security policy is usually non-selectively enforced on all incoming data to the device, but not outgoing data (e.g., all incoming data is encrypted, but outgoing data is not considered). However, it is desirable for a security policy to be enforceable through a multipurpose solution that is compatible across various platforms (e.g., for enforcement on various types of servers), and for the security policy to be selectively enforceable on incoming and outgoing data on the device.

SUMMARY OF THE INVENTION

A method, system, and computer program product for data security policy enforcement is provided. The method includes inspecting incoming and outgoing data packets from a server computing device for attributes in accordance with a data security policy, processing the data packets in accordance with the security policy based on the inspected attributes, and routing the data packets in accordance with the security policy based on the inspected attributes, wherein incoming and outgoing data from the server computing device composed of the data packets is processed and routed in accordance with the security policy on a per-packet basis. A corresponding system and computer program product is also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

According to exemplary embodiments of the invention described herein, a method, system, and computer program product for data security policy enforcement is provided. In accordance with such exemplary embodiments, a data security policy is enforced through a multipurpose solution that is compatible across various platforms and is selectively enforced on incoming and outgoing data from a computing device, for example, on a per-packet basis. Benefits of the exemplary embodiments include improved data security management, improved processor and network performance-efficiency, dynamic manipulation of data security policy, and improved disaster recovery support.

Figure 1:
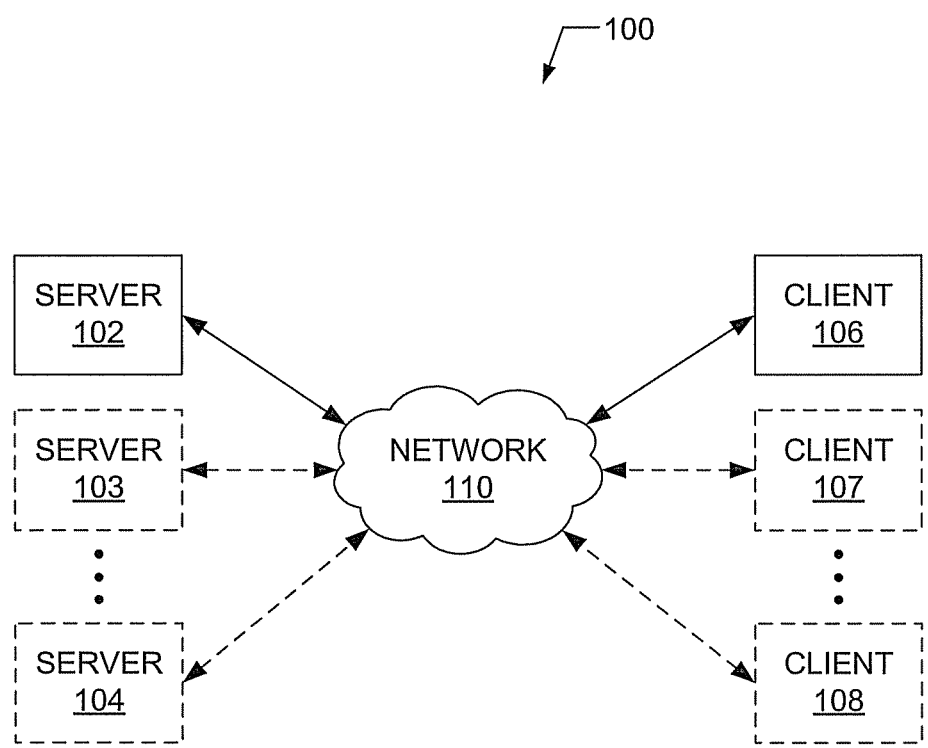
FIG. 1 illustrates an example of a computer network architecture for data security policy enforcement.

Tuning now to the drawings in greater detail, wherein like reference numerals indicate like elements, FIG. 1 illustrates an example of a computer network architecture 100 for data security policy enforcement. The exemplary architecture 100 includes one or more server computing devices ("servers") 102-104 and one or more client computing devices ("clients") 106-108. The servers 102-104 are in communication with the clients 106-108 (and possibly each other) via one or more communications networks ("network") 110. For example, the servers 102-104 may communicate with the clients 106-108 for the transmission of data between them.

The network 110 may include one or more wide area networks (WANs) and/or local area networks (LANs) including the Internet, intranets, or wireless communications networks. In addition to the servers 102-104 and clients 106-108, the exemplary network architecture 100 may include other devices that are not depicted. For example, the servers 102-104 may be in communication with one or more storage devices to access and/or store data.

Figure 2:
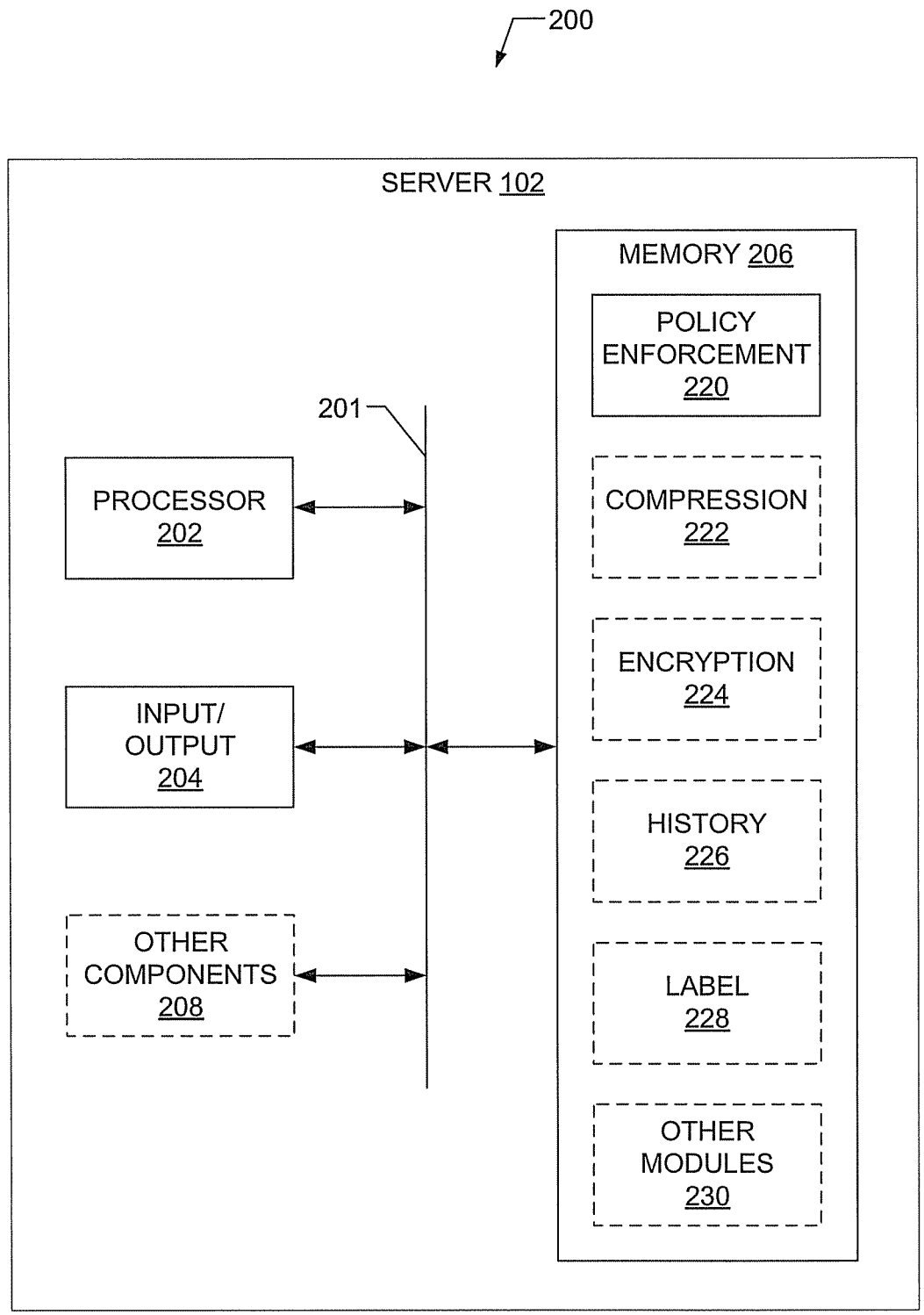
FIG. 2 illustrates an example of a computer hardware architecture for data security policy enforcement operable within the computer network architecture of FIG. 1.

FIG. 2 illustrates an example of a computer hardware architecture 200 for data security policy enforcement operable within the computer network architecture 100 of FIG. 1. The exemplary architecture 200 can be included within one of the servers 102 in accordance with exemplary embodiments of the invention. The architecture 200 includes a bus 201 that provides one or more interconnections between various components that are in communication with each other. The architecture 200 also includes a processor 202 (e.g., a central processing unit), which may include one or more processing cores. One or more input/output components 204 (e.g., communication or network adapters) are also included in the architecture 200.

The exemplary architecture 200 further includes one or memories 206 (e.g., read only memory or random access memory) that can store data, software or programs, etc. For example, as depicted, the memory 206 can include one or more program modules including a policy enforcement module 220, a compression module 222, an encryption module 224, a history module 226, a label module 228, and/or other modules 230, the operation of which will be discussed below. The exemplary architecture 200 may also include other components 208 that provide functions such as processing, storage, input/output, etc.

Figure 3:
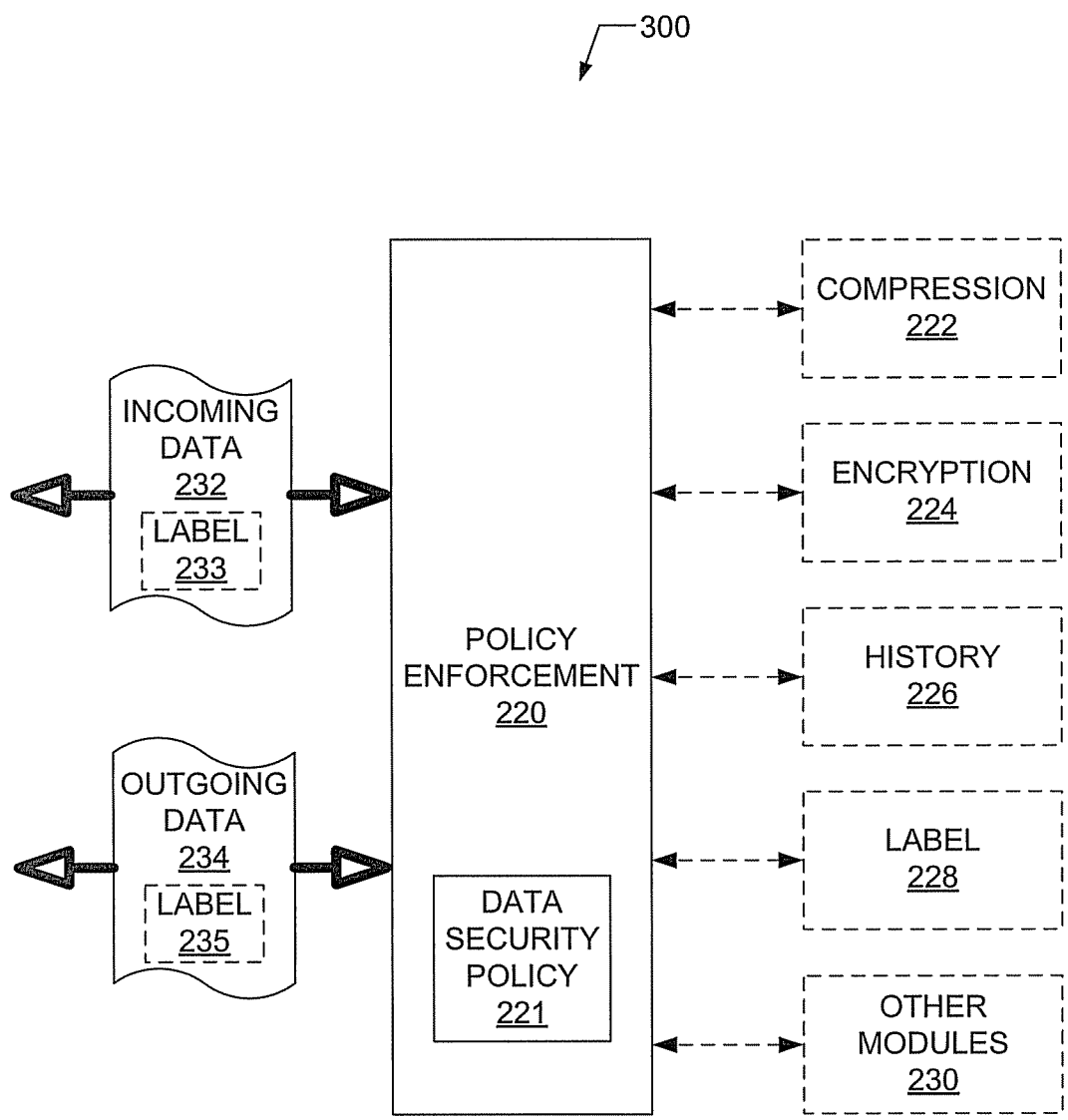
FIG. 3 illustrates an example of a computer software architecture for data security policy enforcement operable on the computer hardware architecture of FIG. 2.

FIG. 3 illustrates an example of a computer software architecture 300 for data security policy enforcement operable on the computer hardware architecture 200 of FIG. 2. The exemplary architecture includes the one or more program modules residing in the memory 206 such as the policy enforcement module 220, the compression module 222, the encryption module 224, the history module 226, the label module 228, and/or other modules 230. The policy enforcement module includes a data security policy 221, which includes guidelines, instructions, etc. for the security-related management of data, for example, regarding compression, encryption, etc. In accordance with exemplary embodiments of the invention, incoming data 232 and outgoing data 234 (e.g., in the form of data packets) is inspected, analyzed, etc. by the policy enforcement module 220 and routed to one or more of the other modules 222, 224, 226, 228, 230 accordingly for processing as discussed further below. The incoming data 232 and outgoing data 234 may include one or more labels 233, 235 represented by one or more bits of the data 232, 234 that identify security classifications of the data 232, 234.

Figure 4:
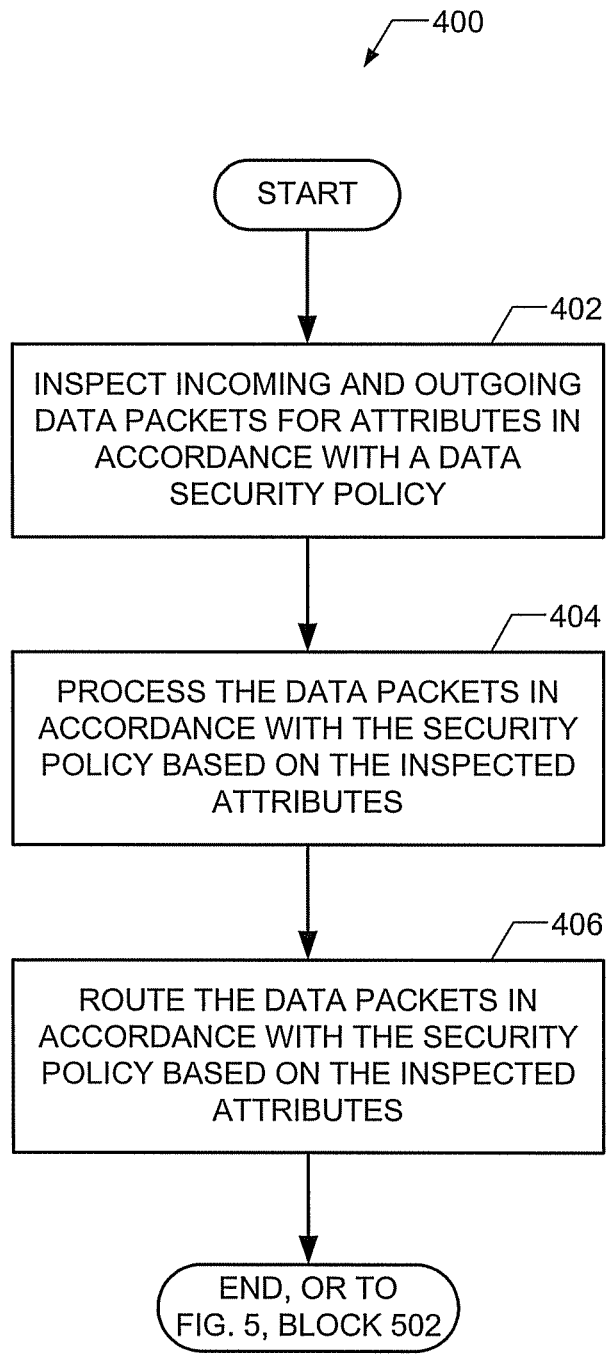
FIG. 4 illustrates an example of a method for data security policy enforcement executable through the computer software architecture of FIG. 3.

FIG. 4 illustrates an example of a method 400 for data security policy enforcement executable through the computer software architecture 300 of FIG. 3. In block 402, incoming and outgoing data packets 232, 234 are inspected for attributes in accordance with a data security policy 221. This may be performed, for example, by the policy enforcement module 220 on data packets that form incoming data 232 and outgoing data 234. In some embodiments, the inspection is a deep packet inspection performed, for example, by the server 102 or another device in communication (e.g., integrated in the same hardware package) with the server 102. Inspected attributes may include the intended destination of the data packets, the status of whether the data packets are compressed, encrypted, etc., or other characteristics related to the security, processing, routing, etc. of data. Furthermore, the inspected attributes may also include information represented by the labels 233, 235 included with the data packets 232, 234, such as a security classification of the data packets 232, 234.

In block 404, the data packets 232, 234 are processed in accordance with the security policy 221 based on the inspected attributes. This may also be performed by the policy inspection module 220. The processing of the data packets 232, 234 may include compression, encryption, etc. by the corresponding modules 222, 224, 226, 228, 230. For example, depending on the security policy 221 with respect to the inspected attributes, the data packets 232, 234 may be compressed and/or encrypted. As a more specific example, the security policy 221 may provide for outgoing data 234 from the server 102 to a client 106 to be encrypted and, therefore, outgoing data packets 234 that are not encrypted when inspected are caused to be encrypted by the encryption module 224 before transmission to the client 106. This processing is performed on a per-packet basis, which reduces overhead and improves performance and efficiency of the processor 202 as well as the network 110 in general. Furthermore, the processing provides an alternative to accepting or rejecting data, since data can be processed to meet the security policy 221.

In block 406, the data packets 232, 234 are routed in accordance with the security policy 221 based on the inspected attributes. This routing may also be performed by the policy enforcement module 220. The routing may include the delivery of the data to the processor 202, input/output components 204, memory 206, other components 208, or the clients 106-108. For example, depending on the security policy 221 with respect to the inspected attributes of the data packets 232, 234, the destination of the data may be limited to a certain location, partition, etc. within the server 102 or client 106, or access to the data packets 232, 234 may be limited to a certain user or class of users of the server 102 or client 106. This routing provides for simplifying the switch management interface of a network 110, which can be complex and include many switches in large networks. Furthermore, the routing provides for rapid modification of the data security policy in response to changing conditions, such as disaster recovery. In some embodiments, the method 400 may continue from block 406 to block 502 of FIG. 5.

Figure 5:
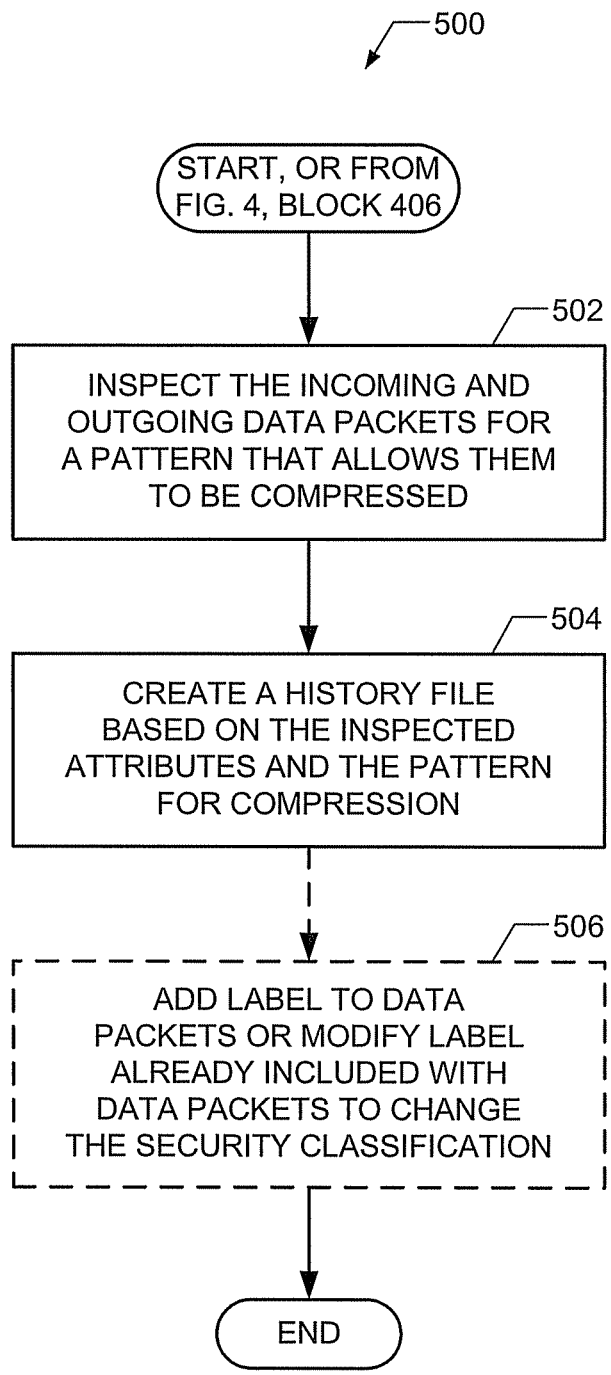
FIG. 5 illustrates another example of a method for data security policy enforcement executable through the computer software architecture of FIG. 3.

FIG. 5 illustrates another example of a method 500 for data security policy enforcement executable through the computer software architecture 300 of FIG. 3. In block 502, incoming and outgoing data packets 232, 234 are inspected for one or more patterns that allows the data packets 232, 234 to be compressed. For example, the data packets 232, 234 may be inspected for repeating patterns that support compression according to lossless data compression methods such as the Lempel-Zif Stac algorithm (LZS) or according to other data compression methods. This inspecting may be performed by the policy enforcement module 220. Furthermore, in some embodiments, the inspecting of the data packets 232, 234 for security anomalies in block 402 and for repeated, valid data patterns that support compression in block 502 can be performed in a single process.

In block 504, a history file is created based on the inspected attributes and inspected patterns for compression of the data packets 232, 234. This may be performed by the history module 226. The history file can provide a reference, for example, to one or more of the servers 102-104 for compression and encryption of data packets 232, 234 in a single process. For example, this combined history file supports the compression of data before it is encrypted to facilitate the proper function of components such as the input/output components 204 of the server 102. Since the history file provides a reference of inspected data packets 232, 234, it allows compression and encryption of data on a per-packet basis instead of an all or none basis, which also reduces overhead and improves performance and efficiency of the processor 202 as well as the network 110 in general.

In some embodiments, in block 506, one or more labels 233, 235 may be added to the data packets 232, 234, or one or more labels 233, 235 that are already included with the data packets 232, 234 may be modified, for example, to change the security classification of the data packets 232, 234. This may be performed by the label module 228. The labels 233, 235 may be represented by one or more bits of the data packets 232, 234 (e.g., subfields of bits in a data header) and identify security classifications of the data packets 232, 234. This label processing of the data packets 232, 234 can allow security policy enforcement with respect to classification and retention of data and can also establish delivery priority and service levels for data delivery, disaster recovery retention, and business continuity purposes. For example, enforcement of a security policy 221 in accordance with the labels 233, 235 may provide for the transmission of mission critical data to be contingent upon the duplicate transmission of the data to a disaster recovery server.

The exemplary network, hardware, and software architectures 100, 200, 300 are illustrated and described with respect to various components, modules, etc. for exemplary purposes. It should be understood that other variations, combinations, or integrations of such elements that provide the same features, functions, etc. are included within the scope of embodiments of the invention.

The flow diagrams depicted herein are just examples. There may be many variations to these diagrams or the blocks (or operations) described therein without departing from the spirit of embodiments of the invention. For instance, the blocks may be performed in a differing order, or blocks may be added, deleted or modified. All of these variations are considered a part of the claimed invention. Furthermore, although the execution of the flow diagram blocks is described with respect to the exemplary network, hardware, and software architectures 100, 200, 300, execution of the flow diagram blocks may be implemented with other hardware and/or software architectures that provide the same features, functions, etc. in accordance with exemplary embodiments of the invention.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport the program for use in connection with the instruction execution system, apparatus, or device.

The computer-usable or computer-readable medium can be an electronic, magnetic, optical, electromagnetic, infrared, or semiconductor system (apparatus, device, etc.) or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Some current examples of optical disks include compact disk-read only memory (CD-ROM), compact disk-read/write (CD-R/W), or digital video disk (DVD).

A data processing system suitable for storing and/or executing program code can include at least one processor coupled directly or indirectly to memory elements through a system bus. The memory elements can include local memory employed during actual execution of the program code, bulk storage, or cache memories that provide temporary storage of at least some program code to reduce the number of times the code needs to be retrieved from bulk storage during execution.

Input/output (I/O) devices (e.g., keyboards, displays, pointing devices, etc.) can be coupled to the data processing system either directly or through intervening I/O controllers. Network adapters may also be coupled to the data processing system to allow the system to be coupled to other data processing systems or remote printers or storage devices through intervening private or public networks. Telephonic modems, cable modems, and ethernet cards are a few examples of the currently available types of network adapters.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for data security policy enforcement, the method comprising: inspecting incoming and outgoing data packets from a server computing device for attributes in accordance with a data security policy, the attributes including a label, the label contained within the data packet and indicating a security classification of the incoming and outgoing data packets; processing the data packets in accordance with the security policy based on the label; and routing the data packets in accordance with the security policy based on the label; wherein incoming and outgoing data from the server computing device comprising the data packets is processed and routed in accordance with the security policy on a per-packet basis, the processing comprising limiting the destination of the data packets to a certain storage location within a destination computing device, and wherein the attributes include a status of whether the data packets are compressed or encrypted; and inspecting the incoming and outgoing data packets for a pattern that allows the data packets to be compressed; and creating a history file based on the inspected attributes and the pattern for compression, wherein the history file is a reference to compress and encrypt the data packets in one process.

2. The method of claim 1, wherein processing the data packets includes at least one of compressing and encrypting the data packets prior to storage on the server computing device or transmission from the server computing device to a client computing device.

3. The method of claim 1, wherein routing the data packets includes limiting access of the data packets to a certain user of at least one of the server computing device and the client computing device.

4. The method of claim 1, further comprising modifying the label to change the security classification of the data packets.

5. The method of claim 1, wherein the processing of the data packets in accordance with the security policy based on the label comprises a classification and retention of data, establishment of delivery priority and service levels for data delivery, and disaster recovery retention.

6. A system for data security policy enforcement, comprising: a server computing device including a processor in communication with a memory and an input/output component, wherein the server computing device is in communication with a client computing device; a policy enforcement module operating within the server computing device and configured to: inspect incoming and outgoing data packets from the server computing device for attributes in accordance with a data security policy, the attributes including a label, the label contained within the data packet and indicating a security classification of the incoming and outgoing data packets; process the data packets in accordance with the security policy based on the label; and route the data packets in accordance with the security policy based on the label; wherein incoming and outgoing data from the server computing device comprising the data packets is processed and routed in accordance with the security policy on a per-packet basis, the processing comprising limiting the destination of the data packets to a certain storage location within a destination computing device, and wherein the attributes include a status of whether the data packets are compressed or encrypted; and inspect the incoming and outgoing data packets for a pattern that allows the data packets to be compressed; and create a history file based on the inspected attributes and the pattern for compression via a history module configured therefor, and operating within the server computing device, wherein the history file is a reference to compress and encrypt the data packets in one process.

7. The system of claim 6, wherein the policy enforcement module is configured to process the data packets via a compression module operating within the server computing device and configured to compress the data packets prior to storage on the server computing device or transmission from the server computing device to the client computing device.

8. The system of claim 6, wherein the policy enforcement module is configured to process the data packets via an encryption module operating within the server computing device and configured to encrypt the data packets prior to storage on the server computing device or transmission from the server computing device to the client computing device.

9. The system of claim 6, wherein the policy enforcement module is configured to route the data packets by limiting access of the data packets to a certain user of at least one of the server computing device and the client computing device.

10. The system of claim 6, wherein the policy enforcement module is further configured to modify the label to change the security classification of the data packets via a label module configured therefore, and operating within the server computing device.

11. The system of claim 6, wherein the policy enforcement module is configured to process the data packets in accordance with the security policy based on the label to: provide a classification and retention of data, establish delivery priority and service levels for data delivery, and provide disaster recovery retention.

12. A computer program product for encryption key management, comprising a non-transitory computer readable storage medium having a computer readable program embodied thereon, wherein the computer readable program, when executed on a computer, causes the computer to:
inspect incoming and outgoing data packets from the computer for attributes in accordance with a data security policy, the attributes including a label, the label contained within the data packet and indicating a security classification of the incoming and outgoing data packets; process the data packets in accordance with the security policy based on the label; and route the data packets in accordance with the security policy based on the label; wherein incoming and outgoing data from the server computing device comprising the data packets is processed and routed in accordance with the security policy on a per-packet basis, the processing comprising limiting the destination of the data packets to a certain storage location within a destination computing device, and wherein the attributes include a status of whether the data packets are compressed or encrypted; and inspect the incoming and outgoing data packets for a pattern that allows the data packets to be compressed; and create a history file based on the inspected attributes and the pattern for compression, wherein the history file is a reference to compress and encrypt the data packets in one process.

13. The computer program product of claim 12, wherein the computer readable program, when executed on the computer, causes the computer to process the data packets by performing at least one of compressing and encrypting the data packets prior to storage on the computer or transmission from the computer to another computer.

14. The computer program product of claim 12, wherein the computer readable program, when executed on the computer, causes the computer to route the data packets by limiting access of the data packets to a certain user of at least one of the computer and the other computer.

15. The computer program product of claim 12, wherein:
the attributes include at least one of an intended destination of the data packets, a status of whether the data packets are compressed or encrypted, and a security classification of the data packets; and
the computer readable program, when executed on the computer, further causes the computer to add the label to the data packets or modify the label to change the security classification of the data packets.

16. The computer program product of claim 12, wherein the computer readable program, when executed on the computer, causes the computer to process the data packets in accordance with the security policy based on the label to: provide a classification and retention of data, establish delivery priority and service levels for data delivery, and provide disaster recovery retention.

* * * * *